No. 824,620.  
PATENTED JUNE 26, 1906.
J. C. BROCK & C. J. BOOKER.  
THILL AND POLE SUPPORT.  
APPLICATION FILED NOV. 28, 1905.
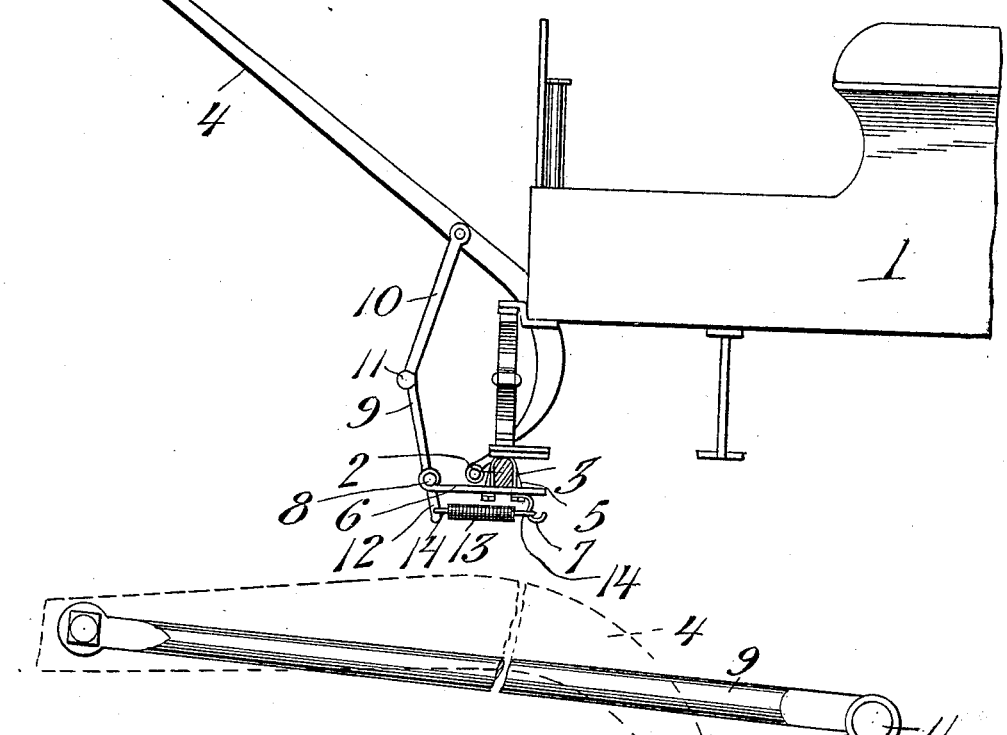
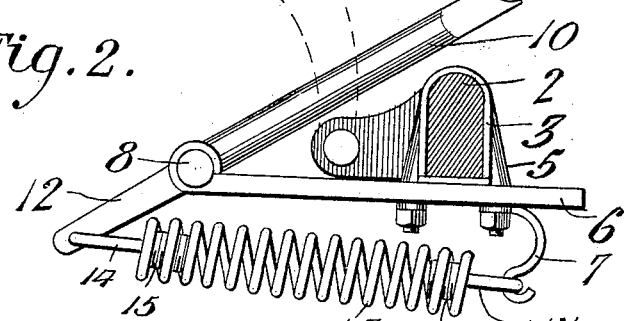
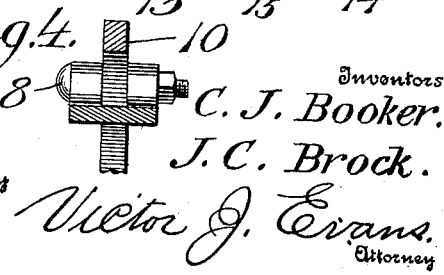
Witnesses  
Phil E. Barnes  
D. W. Gould
Inventors  
C. J. Booker  
J. C. Brock  
By Victor J. Evans  
Attorney

UNITED STATES PATENT OFFICE.

JAY C. BROCK AND CARSNER J. BOOKER, OF GREENVILLE, OHIO.

THILL AND POLE SUPPORT.

No. 824,620.　　　　Specification of Letters Patent.　　　Patented June 26, 1906.

Application filed November 28, 1905. Serial No. 289,520.

*To all whom it may concern:*

Be it known that we, JAY C. BROCK and CARSNER J. BOOKER, citizens of the United States, residing at Greenville, in the county of Darke and State of Ohio, have invented new and useful Improvements in Thill and Pole Supports, of which the following is a specification.

This invention relates to thill and pole supports, and has for its objects to produce a comparatively simple inexpensive device of this character which may be readily installed for use, one which in practice will effectually support the thill in upturned position, one which permits of ready movement of the thill to active position, and one whereby the thill will when not in use be automatically moved to normal raised condition.

With these and other objects in view the invention comprises the novel features of construction and combination of parts more fully hereinafter described.

In the accompanying drawings, Figure 1 is a side elevation, partly in section, of a portion of a vehicle equipped with a thill-support embodying the invention and showing the parts in normal condition. Fig. 2 is an enlarged side elevation of the device, illustrating the position of the parts with the thill lowered. Fig. 3 is a detail sectional view of a portion of the base-plate and clip-bolt. Fig. 4 is a detail view, partly in section, showing the manner of connecting the supporting-lever with the base-plate.

Referring to the drawings, 1 represents a vehicle having an axle 2, to which is pivoted, as at 3, a thill 4, these parts, which are conventionally shown herein, being of the usual or any preferred construction and material and adapted in practice to perform their ordinary functions.

Attached to the axle 2 by means of a clip-bolt 5 is a base-plate 6, provided at its rear end with an engaging member or hook 7 and having pivoted to its forward end, as at 8, a lifting member or lever 9, adapted for connection by means of a relatively movable portion or section 10, pivotally connected to the main body of the lever by a hinge-joint 11, there being provided on the lever 9 an arm or extension 12, which projects below the base-plate 6.

Extended between the hook 7 and extension 12 is a normally contracted spring 13, having terminal engaging portions or hooks 14, provided with screw-threaded shanks 15, entered into the ends of the spring, said hooks being designed for engagement, respectively, with the member 7 and extension 12, while formed in the base-plate 6 is a longitudinally-extending slot 16, through which the clip-bolt 5 is engaged, as illustrated more clearly in Fig. 3.

In practice the thill 4 is normally sustained in the position illustrated in Fig. 1, under which conditions the spring 13 is contracted for maintaining the lever 9 in forwardly-inclined position, as shown, to support the thill in elevated condition. When, however, it is desired to lower the thill for use, the section 10 breaks joint at 11 with the lever and causes the latter to move to the rearwardly-inclined position, as seen in Fig. 2, thus swinging the extension 12 forwardly and expanding the spring 13, whereupon the spring will in again contracting and upon release of the thill 4 operate the parts for returning the latter to normal raised condition.

From the foregoing it is apparent that we produce a simple device admirably adapted for the attainment of the ends in view, it being understood that in attaining these ends minor changes in the details herein set forth may be resorted to without departing from the spirit of the invention.

Having thus fully described our invention, what we claim as new, and desire to secure by Letters Patent, is—

1. In a device of the class described and in combination with a vehicle axle and thill, of a base member attached to the axle, a supporting-lever pivoted to the base and having a relatively movable section pivotally connected with the thill, and a normally contracted spring operatively engaged with the lever and base member for maintaining the parts in normal condition.

2. In a device of the class described and in combination with a vehicle axle and thill, of a base member adjustably connected with the axle, a supporting-lever pivoted to the base and having a relatively movable section pivotally connected with the thill, and a normally contracted spring operatively engaged with the lever and base member for maintaining the parts in normal condition.

3. In a device of the class described, and in combination with a vehicle axle and thill, of a base member adjustably connected with the axle and having an engaging portion, a supporting-lever pivotally connected with the base member and having an arm extended therethrough, said lever having a relatively movable section pivotally connected with the thill, and a spring engaged with the lever-arm and engaging member and serving to maintain the parts in normal condition with the thill raised.

In testimony whereof we affix our signatures in presence of two witnesses.

JAY C. BROCK.
CARSNER J. BOOKER.

Witnesses:
O. R. KRICKENBERGER,
J. C. SMITH.